July 21, 1942.  W. W. HARTMAN ET AL  2,290,429
MUD SCRAPING DEVICE
Original Filed March 7, 1940
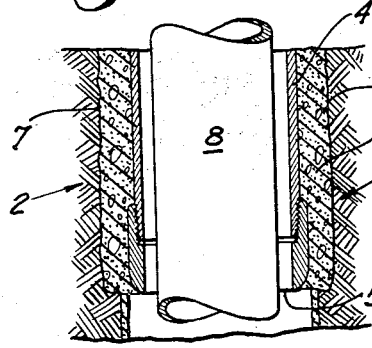
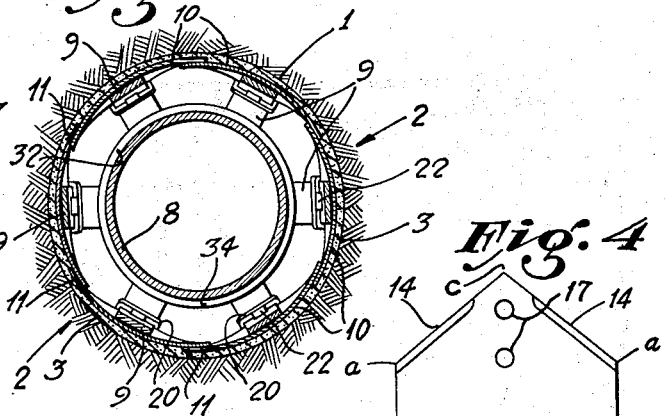
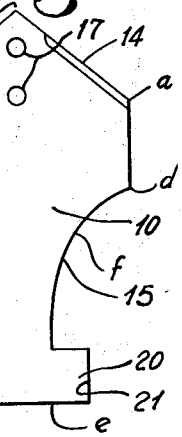
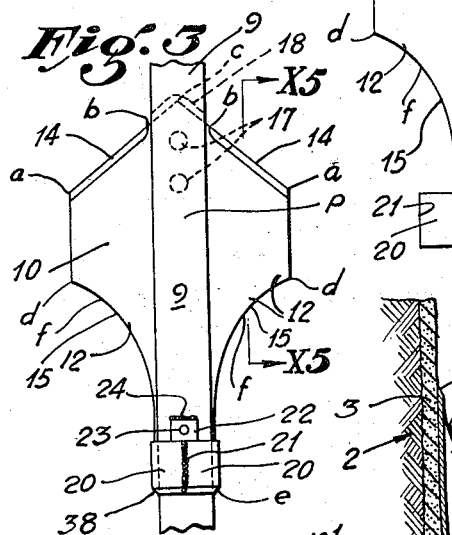
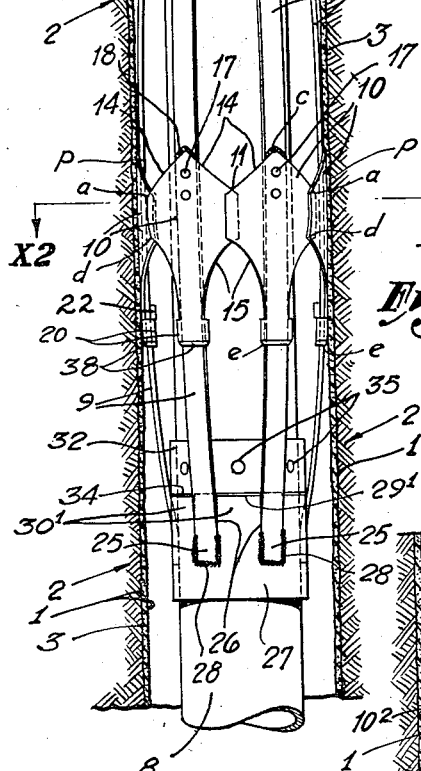
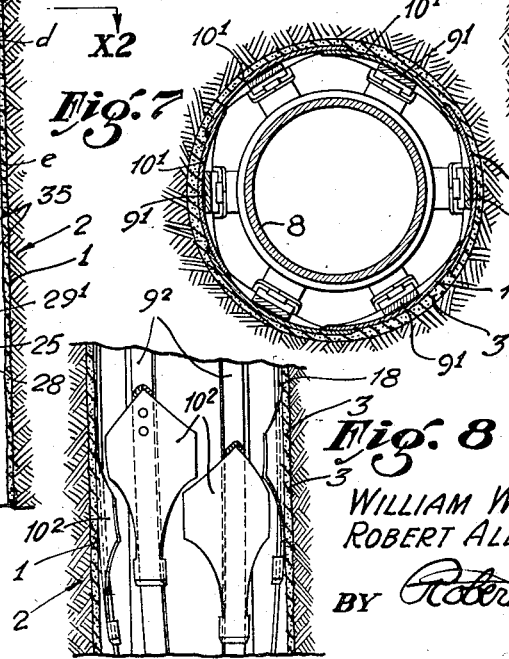
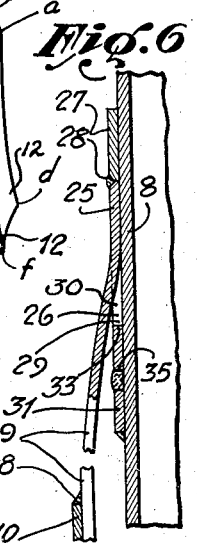
INVENTORS:
WILLIAM WALTER HARTMAN and
ROBERT ALEXANDER STEPS;
BY Robert A. Steps
ATTORNEY.

Patented July 21, 1942

2,290,429

UNITED STATES PATENT OFFICE 2,290,429

MUD SCRAPING DEVICE

William Walter Hartman and Robert Alexander Steps, Los Angeles, Calif.

Substituted for abandoned application Serial No. 322,724, March 7, 1940. This application November 30, 1940, Serial No. 368,094

6 Claims. (Cl. 166—18)

This invention relates to mud removing mechanism for use in wells during the drilling and casing thereof, and especially during proper preparation of the well hole for effecting a cement job therein.

The present application is a substitute for application Serial Number 322,724, filed March 7, 1940, and which became abandoned on November 17, 1940.

In drilling wells according to the rotary system, it is customary to circulate heavy mud down through the drill stem and up through the well hole, the benefits of this mud circulation being well known and unnecessary to describe here. However, owing to the great hydrostatic pressure which this mud column sets up in deep wells against the open walls thereof, and because of a certain porosity of the earth formation comprising these walls, the water component of this mud tends to leak or filter out into the formation, and as this occurs the fine particles in the mud tend to build up a mud cake or wall that might be likened to a filter cake plastered around the walls of the well hole and making the bore of the well hole somewhat smaller than the original drilled diameter thereof by the thickness of this mud cake. Naturally this mud cake will tend to be thicker where the earth formation is very porous, and it is probably entirely absent or negligible where the earth formation is impervious to water filtration.

When such drilling of the well has proceeded to a certain depth determined by considerations that need not be discussed here, it is customary to install pipe or casing in the well to that depth, and by well known processes to then force a cement column up in the space between this casing and the well hole, such column of cement being often a few hundred feet high and extending from the bottom of the casing upward. The purpose of this cement column is to positively seal off the entire space between the casing and the walls of the hole, to prevent flow of water or other undesirable materials from the upper part of the well downward along the outside of this pipe or casing into the lower parts of the well where the oil, gas, or other desired products are produced by the well. The effectiveness of this cementing operation, as a seal against contamination, is a very important consideration in the successful completion of wells.

In connection with such cementing it is apparent that the possible presence of mud cake as above described, covering the earth formation in the well hole, may prevent the cement from setting directly against this earth formation. Furthermore, this mud cake may sometimes be of character to impair the ability of the cement to correctly perform its sealing action as above described, and in general it is deemed advantageous to have the cement fill the entire space and make good bond between the earth formation and the steel casing to insure a perfect seal. This is not so certain if a mud cake intervenes between the cement and the earth formation.

It is an object of this invention to provide simple, dependable and efficient instrumentalities which can be used in the well hole to remove the mud cake from the well bore or hole where desired, so that the cement may make direct bond with the formation and completely fill the space between the casing and the formation.

It is another object of this invention to provide simple, dependable and efficient instrumentalities whereby little or no mud cake is removed from the wall of the well bore while the device is being lowered into the well, but whereby the mud cake is efficiently and completely removed from the wall of the well while the device is being moved upward through the well.

While certain parts and features of our invention are themselves novel, and may be used either with a centralizing guide or separately therefrom as desired, nevertheless it is a further object of our invention, when same is constructed in the form we most prefer, to combine such parts and features with a pipe or casing centralizing guide so that our invention makes possible the combined benefits of properly removing mud from the formation wall, so the cement will make good bond, and also properly centralizing the pipe or casing in the hole so that the cement column will be of uniform thickness around the casing, in order through both these advantages to give best assurance of a successful cementing job.

Other objects, benefits and advantages of our invention will become apparent from consideration of the following description, also of the appended claims and the drawing.

In this specification we will disclose our invention in its at present preferred form, together with certain modifications thereof, but we do not limit ourselves to this form or to the particular modifications disclosed, because various further changes, modifications and adaptations can be made in this invention without departing from the essence or scope thereof as expressed in the appended claims. Also certain objects, advantages and benefits of this invention will be apparent to those skilled in the art, and the same are included within the scope of this invention even though not specifically mentioned herein.

In the accompanying drawing like parts are designated by like reference numerals.

Fig. 1 is an elevation of the well hole, partly in section, showing one form of mechanism embracing our invention, located therein.

Fig. 2 is an enlarged transverse section taken on line X²—X² of Fig. 1 looking in the direction of the arrows.

Fig. 3 is an enlarged elevation view of a portion of a spring with a mud removing member thereon, this view being procured by looking at these parts in Fig. 1 from the inside outward.

Fig. 4 is an elevation view of the mud scraping member shown in Figs. 1 and 3 before same is mounted on the spring.

Fig. 5 is a sectional view of the mud scraping member alone, taken along line X⁵—X⁵ of Fig. 3, looking in the direction of the arrows.

Fig. 6 is an enlarged transverse section taken in the plane of the paper of a fragment of the mechanism shown in Fig. 1, and including parts that will be hereinafter more particularly identified.

Fig. 7 is a transverse section similar to Fig. 2, but showing a modification of the mechanism that will be hereinafter mentioned.

Fig. 8 is a partial section similar to Fig. 1, but showing another modification that will be hereinafter referred to.

Fig. 1 illustrates the well hole 1 drilled through the formation 2, the latter consisting of earth, shale, boulders or the like, and against the walls of this well hole and in a sense forming a part thereof, is shown a layer of mud cake 3 formed thereon in manner already described.

In the upper portion of Fig. 1 is shown a comparatively large sized well casing or pipe 4 already installed in the well to a depth indicated at 5, which may be several thousand feet below the surface of the earth, and around this casing 4 is shown cement 6 completely filling the space between the outer surface of the casing and the previously drilled portion 7 of the well hole, there being no mud cake shown between the cement 6 and formation 2 as such mud cake is presumed to have been removed to illustrate a good clean cement job.

Through the drilled hole 1 and through the already installed casing 4, the somewhat smaller pipe or casing 8 is shown in the course of being lowered from the surface of the earth to the bottom of the drilled hole 1, and when landed at the bottom this casing 8 will presumably be cemented in place there in approximately the manner that the larger casing 4 is shown landed and cemented in the well hole 7.

On the pipe or casing 8 is shown our preferred form of mud remover, or mud scraping device, the same being in this instance combined to function also as a pipe or casing centralizer in the well hole, as will later be more particularly described.

Essentially our invention consists in the outwardly bowed springs 9, the same having laterally extending mud removing parts or members 10 thereon, see Figs. 1 and 2. These springs 9 with their mud removing or scraping parts 10, can in the broadest view of this invention, be mounted in any suitable or desired manner whatsoever on the pipe or casing 8, or on any other member or tool on which it is desired to mount and run the same.

Viewing these mud scraping parts 10 as in Fig. 2, they are seen to extend laterally, i. e. sideways, from the springs 9, and in a general way these laterally projecting mud scraping parts are seen to extend sufficiently from the springs to cover approximately the entire space between springs 9, and in this manner the entire perimeter or circumference of the well hole is covered. In this connection it is apparent from the figures that these mud scraping parts are positioned on springs 9 in the vicinity of the peak thereof, i. e. at approximately the place where the springs are bowed outward the furthest from the axis of the well hole, whereby these parts 10 effectively engage the mud cake and the well hole under the substantial pressure set up by the outward reaction of the bowed springs 9, it being understood that in the figures these springs are assumed to be somewhat compressed below their normal free size. In fact, when free, we prefer that the bowing of the springs should bring them to slightly larger diameter than the actual diameter at which the well hole is drilled.

Furthermore, while we consider it an added feature of improvement, and prefer that these parts 10 should extend laterally from the springs sufficiently to overlap each other as indicated in Figs. 1, 2 or 7, nevertheless this is not altogether necessary in the broadest aspect of our invention, because the device can be moved lengthwise of the well hole several times to remove the mud, and it can be turned slightly between such movements, in which case the mud removing parts or members 10 will during such movement scrape or remove the mud cake 3 from the walls of the hole more or less satisfactorily even if the laterally extending scraper parts do not entirely cover the space between the springs, i. e. do not entirely cover the circumference of the well hole as viewed in Fig. 2, but we consider it an important advantage that they should do so, and that they should overlap for this purpose as shown in Figs. 1 and 2. When constructed in this latter manner, the complete removal of the mud cake from the formation wall is more certain, positive and dependable.

Also, it is apparent that the laterally extending mud scraping parts 10 could readily be formed or fashioned as an integral part of the spring material itself, i. e. the spring together with its lateral mud scraping projection, or projections, may be stamped, rolled or otherwise fabricated as one piece from the same original sheet or piece of metal, this rudimentary modification being so simple that no separate illustration thereof is thought necessary in the drawing, and consequently such drawing is omitted, but for reasons that will presently be brought out we prefer to make the mud scraping members 10 separately, and to attach them to the springs, and it is in this form that our invention is illustrated in the drawing.

As already intimated the precise shape and contour of the laterally extending mud scraping parts 10, illustrated in Fig. 1 is subject to much change and alteration within the scope of our invention, but we consider that there are special features of advantage and improvement in the shape and contour of these members 10 as shown in the drawing, but before discussing this further, and in order to make these advantages and improvements more clear, we will first describe a procedure which is followed more or less generally during the lowering and setting of the casing 8 in the well.

During such lowering of the pipe or casing it is understood that there is no mud circulation, i. e. no mud is being pumped down through this casing and up from the bottom thereof through the well hole, the absence of circulation at this time being due to pipe 8 being "floated in." However, when pipe 8 reaches the bottom of the hole, and in preparation for the introduction of the cement, circulation down through this pipe and up through the well bore outside the pipe is set up, the object being to clarify the mud then in the well hole by replacing it either with comparatively light mud, or even with practically clear water, so that when the cement is introduced it will be set in almost clear water at the bottom of the hole. The reason for this is that cement sets up stronger and better in water that is clear or reasonably clear, than it does in heavy mud. During this portion of the circulation some of the mud cake 3 will no doubt be washed off the sides of the hole, but it is reasonable to suppose that a portion of the mud cake remains thereon. Furthermore, during the circulation just referred to, the pipe 8 is slowly raised and lowered in the well as an aid to circulation and for the purpose of keeping the pipe free against any tendency of the formation to cave and seize the pipe. Ordinarily the distance traversed during this up and down movement is rather limited in extent. It is during the upward portion of this up and down movement of the pipe that the most effective scraping of mud cake from the walls of the well is procured by our at present preferred form of our invention as illustrated in the figures. In this connection we desire to point out that in this form of our device features are intentionally included to provide that during the lowering of pipe 8 through the open well hole, which may be a few thousand feet in depth or more, the members 10 should scrape or remove as little mud as possible from the walls of the hole. The reason is that if these members scraped the mud off all the way down along thousands of feet of open hole, there might then be such an accumulation of mud in the bottom of the hole as to make it difficult to carry pipe 8 to the bottom of the hole, and another objection is that there may be places along the formation where it is not desirable to remove the mud as this might promote caving of the walls if the supporting power of the mud cake were removed. In short there are cases where it is desired to run the mud remover to the bottom of the hole with minimum disturbance of the mud during descent, and to meet these requirements we form parts 10 and position them on the springs so that the upper portion, say from "a" to "b", or "c", in Fig. 3, lies approximately at the peak "p", Fig. 1, of the spring 9, i. e. approximately at the place where the spring is bowed outwardly the furthest, or in any event, we form and position these upper edges 14 of members 10 so as to insure that they bear firmly against and engage the mud cake and well wall under the expansive force of springs 9 to thereby scrape or remove the mud cake from the wall of the well hole during any upward movement of the device through the well. At the same time the lower portion or edges 15 of the blades or members 10, say from point "d" toward the lower end "e" thereof, see Figs. 1, 2, 3, 5, 7 and 8, gradually recede from the mud cake and well wall toward the axis of center of the device, to thereby normally clear the well wall, so that during descent through the well the lower portion of this member 10 acts more or less like a sled runner to not cut the mud from the well wall but rather to glide over and compress it with relatively little disturbance of the mud during descent, or at least less disturbance and removal of the mud from the wall of the well hole during descent than during ascent of the device. Reference to the sectional view of member 10 as shown in Fig. 5 illustrates in magnified form this receding of the lower portion of the mud removing part 10 from the well wall by showing the lower portion 12 thereof as warped inward as it approaches its bottom contour "f", see Fig. 5 in connection with Figs. 1, 2, 3, 7 and 8. Therefore, by thus forming and bringing the lower portion and edges 15 of members 10 in closer to the center or axis of the device than the upper edges 14, as just indicated, it is apparent that the lower portion and edges of the parts or members 10 will tend to clear the mud cake and well wall and will more or less slide or trowel over the mud 3 and compress it during descent, rather than to cut it away from the wall at this time.

However, during ascent of blades 10 through the hole there is no such troweling action and the upper edges 14 of members 10, being pressed by the springs hard against the loose soft mud will tend to plow into this mud cake and remove or scrape it from the well hole during the upward motion of pipe 8 in the well. However, since circulation upward through the well has been started just prior to this and is proceeding at this time, the mud scraped from the well wall will be floated or washed upward and discharged from the well at the surface of the earth, and there is no risk of clogging the well or sticking the pipe.

We consider this improvement whereby the device can be run down with minimum mud scraping, but whereby efficient scraping and mud removal occurs during the up stroke of the pipe and device, as a desirable and important feature of the invention.

A further feature of improvement to which we wish to call attention is the fact that the upper scraping edges 14 of members 10 diverge from each other as they sweep laterally outward and downward from each side of spring 9, i. e. the portion of these edges between "a" and "b", Fig. 3, diverge from each other as just stated, the object and advantage being twofold, first, to cut or scrape the mud from the well wall with a clean shearing action, and second, to insure that these blades 10 will freely and automatically collapse inward toward the body of pipe 9 when the springs 9 are pulled upward through any restriction in the hole, as for instance if it should be necessary to pull the device up into casing 4 through the bottom opening thereof at 5, see Fig. 1. That is, the sloping divergence of edges 14 will permit member 10 to enter opening 5 easily, and to this end it is essential that both edges should slope and diverge on each side of the spring 9. Another important advantage in having these upper scraping edges 14 of member 10 diverge out and downwardly on both sides of spring 9, is that while the scraping action is occurring, during the upward movement of the device, the downwardly directed scraping resistance on one side of the blade and spring 9, will to a considerable degree balance the like resistance on the other side of the blade and spring 9, so that the action will therefore tend to be balanced and to stabilize the spring 9 and thus the entire device will be more durable and dependable than if the scraping edge swept out and downward from one side of the spring only.

Likewise we prefer that the lower edges 15 of members 10, should diverge from each other as they pass laterally outward and upward from the spring. Such divergence of lower edges 15 of member 10 also aids this member in nicely collapsing in unison with spring 9 toward the body of the pipe if the springs must be pulled downward through any undue restriction as indicated at 16, Fig. 1, and as may occasionally occur through intrusion of a boulder, or partial collapse or settling of the formation, or other varied causes.

A further feature of improvement has for its object that members 10 will not interfere at all, or only slightly, with the general flexibility of the bowed springs 9. It will be apparent that if this scraping member 10 were fastened to the spring along the entire upright length of member 10, the latter would add considerable stiffness to spring 9, especially in the area covered by member 10, and the bending of the spring would consequently not be uniform along its length. To prevent this we secure only the upper portion of the scraping member 10 to the spring, this being effected by welding the two members together through holes 17 formed in blade 10, and also by depositing welding metal 18 along the upper edge of blade 10 where it overlaps the spring 9. Incidentally, this welding metal 18 is tapered off gradually from the outer surface of member 10 down to the level of the outer surface of spring 9 so that there will be a wedge or tapered effect there, and not a sharp shoulder, whereby the spring and blade will nicely enter any restriction such as the bottom of casing 4, at point 5, or any other restriction that may be encountered, and also during scraping this part of the blade which passes entirely across the outside of the spring, and the welding metal there located, will scape away and wedge out the mud in the area under or in front of the springs. By means of the welding metal applied at 18 and also at holes 17 as just indicated, the scraping blade 10 is securely attached to spring 9, but only in vicinity of the upper portion of this member. Below the lower hole 17 we prefer to leave this member 10 unattached to the spring in any positive sense, i. e. we prefer to leave the lower portion of member 10 free to slide downward over the outer surface of spring 9 so that if the spring is pressed or flattened down to practically touch pipe 8, as in passing any severe restriction, the member 10 will not interfere with the bending or flattening of the spring, nor with its subsequent expansion, because this lower portion of member 10 is freely slidable over the surface of the spring and does not restrict or cramp the spring. Although the lower end of member 10 is thus slidably free on the spring, we prefer that it should be guided thereon, and this we effect by forming the ears 20 of the scraper blank, see Fig. 4, to embrace the spring and we then weld the adjoining edges 21 thereof together on the inside of the spring as shown in Fig. 3. To prevent this lower portion of the scraper member 10 from stripping upward and buckling off the spring due to friction during descent through any extreme or severe restriction in the hole, we sometimes provide a stop, which may be in the form of member 22 welded to spring 9 through hole 23 and also at 24, see Fig. 3, this stop co-acting with the upper edge of ears 20 of member 10 to keep the latter from buckling or stripping upward under the circumstances mentioned. In other words the lower portion of the scraper blade is free to slide downward along the spring, but it is limited by a stop expedient against sliding upward, buckling of the member being thus avoided, but this does not interfere with free inward bending of the spring because this freedom is assured if the lower end of member 10 can slide downward along the spring.

In Fig. 2 the mud scraping members 10 overlap each other at their lateral extremities 11, between the springs 9, and in this figure the overlapping is seen to proceed around the device by having the left end of one blade lying on the inside of its neighbor while the right end thereof is on the outside of the other neighbor, this sequence being consistent and continuous around the device. This arrangement has the advantage that it can be consistently applied around the entire device irrespective of whether the number of springs be even or odd. In Fig. 7 the overlapping arrangement is slightly different, the alternate members 10$^1$ overlapping each other by having both of the lateral extremities of one of them lying outside of both neighbors, while both lateral extremities of each of these neighbors lie inside of their respective neighbors, and so on around the device. This arrangement is perhaps slightly smoother in appearance than that shown in Fig. 2, but it can only be applied consistently around the entire device when the number of springs is even. In any event by having the adjacent lateral extremities of the neighboring mud scraping parts overlap by lying inside and outside of each other, the helpful operating result is achieved that as this entire scraping device compresses and expands radially in passing down through the various variable bores of the well, for instance in passing from the smaller casing 4, into the larger open hole below it (see Fig. 1), the mud scraping parts will freely slide over each other laterally without danger of their adjacent extremities jamming against and injuring each other.

Fig. 8 illustrates another modification wherein the novel scraping blades are not arranged in a continuous ring around the device as in Fig. 1, but are arranged in staggered elevation as shown. In Fig. 8 the blades are designated by reference numeral 10$^2$, and the springs as 9$^2$.

While certain modifications have been specifically illustrated in Figs. 7 and 8 it is understood that this is not intended to exclude other changes and modifications, many of which can be made without departing from the spirit of our invention.

It has been previously indicated that in accordance with the broader aspect of this invention the mode of mounting the springs 9, with their scraper blades 10, on pipe 8, can be effected in any suitable or desired manner whatsoever, but we prefer to mount them in a certain way as follows:

The ends 25 of the springs 9 are located in slots 26 cut into the substantially cylindrical collars 27, and the spring ends are securely welded to these collars in the slots 26 by depositing welding material 28 along the edges where the springs adjoin the slots. This can be best understood from Figs. 1 and 6. The springs are bowed outwardly from their ends 25, and this bowing proceeds in such manner, as best seen in Fig. 6, that when the spring passes over the end 29 of the collar 27, the inside surface of the spring is entirely clear of the slot 26, which in effect creates a series of fingers 30 between the springs. These fingers point downward in the upper collar 27, and point upward in the lower collar 27, and in each collar these fingers form an abutting shoulder noticed at 29 in Fig. 6. Except for a certain limitation of movement which we will describe in a moment, we prefer to make both collars 27 of such internal diameter that they will slide lengthwise on the pipe 8 and also rotate thereon if necessary. In fact, in this preferred form of the invention, since all the springs 9 have their respective ends welded to the spaced collars 27, it is apparent that a unit is formed comprising these collars 27, the outwardly bowed springs 9 and the scraper blades 10, and this unit excepting certain limitations that we will describe in a moment, is preferably free to slide lengthwise and to rotate on pipe 8. The lengthwise sliding however is limited by a stop secured to pipe 8 between the upper and lower collars 27, this stop in Fig. 1 being in the form of two separate stop rings 31 and 32, the important feature of the stop being that there is an upper shoulder 33 comprising the upper edge of ring 31, and a lower stop shoulder 34 comprising the lower edge of the lower ring 32. The upper stop shoulder 33 is adapted to butt squarely against the bottom face or shoulder 29 of the butting fingers 30 of the upper collar 27, and similarly the lower stop shoulder 34 is adapted to butt squarely against the bottom face or shoulder 29¹ of the fingers 30¹ of the lower collar 27. The stop rings 31 and 32 being securely attached to the pipe by welding deposited in holes 35, it is apparent that the stop shoulders 33 and 34 on these rings are positive abutments carried rigidly on the pipe and adapted to butt against the corresponding shoulders of the collars 27 in the normal position of the latter and without any lost motion between them. By mounting the stop between collars 27 the following important advantage is procured, especially when the pipe is either raised or lowered through any restriction in the hole. If such restriction is to be passed during descent, the butting shoulder 34 on lower stop ring 32 will butt downward against faces 29¹ of the butting fingers 30¹ of collar 27, and the springs 9 being fastened to this collar at their lower edges will be pulled downward through the restriction. By thus pulling the springs downward through such restriction, instead of pushing them through it from above, the springs will fold in nicely against the pipe without buckling or breaking off, and furthermore because of the downwardly converging edges or sides 15 of the scraper blades 10, these blades will also fold in and be drawn nicely through any such restriction. This inward folding of members 10 will occur along their width, that is their radius of curvature as viewed in Figs. 2 and 7 will be reduced, this being effected by action of the downwardly converging edges 15 of blades 10 which will tend to bow and draw these blades laterally inward as they are pulled and drawn through into the restriction. In this action the stops 24, attached to springs 9, and abutting parts 20 of members 10, cooperate as already indicated. Conversely if pipe 8 is raised through any restriction in the hole, as for instance if it should be necessary to raise it sufficiently to pull our device up into casing 4 through the bottom opening thereof at 5 in Fig. 1, it is apparent that the upper shoulder 33 of the upper stop ring 31, would butt against lower face 29 of butting fingers 30 of upper collar 27, see Fig. 1, and the upward movement of pipe 8 would therefore pull springs 9 upward from their upper ends into casing 4, and by thus pulling instead of pushing the springs into the restriction it is apparent that springs 9 would not buckle but would readily fold inward toward pipe 8 and pass freely into and through the restriction and casing 4, and this inward folding would apply also to the scraper blades 10 especially because of the downwardly and outwardly diverging character of upper edges 14 thereof. Because of this convergence these blades 10 tend to bend laterally inward as they are drawn upward into a restriction, i. e., their radius of curvature as viewed in Fig. 2 would become smaller as blades 10 are drawn into such restriction, this being expedited and in fact more or less compelled by the upward convergence of the edges 14. Also the welding 18 at the top of blades 10, being tapered or beveled inward as already described, would also pass freely upward into and through any restriction, as such beveling avoids square shoulders that might hook on. Thus, in the preferred form of our invention as illustrated in Fig. 1 the outwardly bowed springs, with scraper blades 10 thereon, would freely and safely pass any restriction whether pipe 8 is moved upward or downward therethrough, and this smooth passage in either direction is promoted by the cooperative action of the stop mounted on the pipe between collars 27 and the upward convergence of upper edges 14 of members 10, and also the downward convergence of the lower edges 15 of members 10. These edges need not be a straight line as shown at the upper edges 14, nor need they be curved as shown by the lower edges 15, it being apparent that the upper and lower edges of members 10 can both be straight, or they can both be curved, as desired, and the curve can take various forms of divergence as desired.

We might add that in order to promote free passage of blades 10 downward through restrictions, these blades are beveled or tapered downwardly at their extreme lower edges 38, see Fig. 1, but even if they were not so beveled the obstructing shoulder at this point would not ordinarily be as large as indicated in the drawing, because we prefer that the thickness of the material of which members 10 are made should be less than shown, this thickness having been exaggerated in the figures to permit illustration thereof.

With reference to Figs. 3, 4 and 5 we might further add that we prefer to sharpen the upper edges 14 of the scraper blades 10 by beveling these edges upward and outward as shown in these figures, especially between points "a" and "b," Fig. 3. This sharpening improves the mud scraping action of these members 10. However, since the thickness of members 10 is less than that indicated in the drawing, the mud scraping edges thereof will function quite satisfactorily whether they are sharpened or not.

From the foregoing description it is believed that the construction and operation of our mechanism will be readily understood.

To summarize the operation briefly, it is understood that as our mechanism is moved upward through the well hole the laterally extending mud scraping members will remove and clean the mud from the walls. The mud thus removed floats up and out of the well by virtue of the fluid circulation occurring at this stage of the operation.

The formation being scraped clean of mud by action of our device, and the springs 9 functioning also as a centralizer to hold pipe 8 central in the hole, the cement can then be pumped into place in well known manner with the assurance that when the cement is set it will completely fill the space between the pipe and the earth formation proper, and make good bond at all points because of the removal of deleterious mud, and in addition the cement plug thus formed will be of uniform thickness all around the centralized pipe. Such a cementing job gives every assurance of effecting an efficient, successful seal in accordance with the well known objects of cementing. The advantages of freely and safely moving our device either upwards or downwards through any restrictions in the well bore, without risk of injuring either the device or the well, have already been described in detail.

While we have shown the springs 9 as of flat rectangular cross section, they may of course be of round, square or other cross section as desired or to suit special requirements or modifications.

We claim:

1. In a device for scraping mud from the wall of a well, a plurality of outwardly bowed springs and mud scraping blades on the springs, each such blade extending laterally outward from both sides of its spring, the upper part of each such blade being fastened to the spring at a place where the spring is bowed outwardly to approximately its maximum distance from the axis of the device, and the upper edge of each such blade being adapted to engage the wall of the well hole to scrape mud therefrom, and the lower part of each such blade being bowed inwardly to recede from the wall of the well hole toward the center of the device, the lower end of each such blade being free to slide lengthwise of the spring, and a stop means for limiting the upward movement of the lower end of the scraping blade along the spring.

2. In a device for scraping mud from the wall of a well, the combination of outwardly bent springs spaced apart fwrom each other circularly around the axis of the device, and mud scraping parts associated with said springs and extending laterally thereof in curved direction to conform approximately with and contact the circular wall of the well, each such mud scraping part extending sufficiently in such lateral direction that the adjacent lateral extremities of the neighboring mud scraping parts overlap each other by lying inside and outside of each other, so that as said device compresses and expands radially in passing through variable bores of the well said mud scraping parts will freely slide over each other laterally without interference between their adjacent extremities.

3. In a device for scraping mud from the wall of a well, the combination of outwardly bent springs spaced apart from each other circularly around the axis of the device, and metallic mud scraping blades attached to said springs and presenting at approximately the same elevation on both sides of each spring upper mud scraping portions that are curved laterally to conform approximately with and contact the circular wall of the well, and the metal comprising the lower portions of all such blades being bent inward toward the axis of the device to bring such lower portions of all the blades nearer the axis of the device than the said upper mud scraping portions thereof, so that said blades will scrape mud from the wall of the well during the upward movement of the device but will tend to glide over and scrape little or no mud from the wall of the well during the downward movement of the device through the well.

4. In a device for scraping mud from the wall of a well, the combination of outwardly bent springs spaced apart from each other circularly around the axis of the device, and metallic mud scraping blades attached to said springs and presenting at approximately the same elevation on both sides of each spring upper mud scraping edges that diverge downward and laterally outward on both sides of each spring and that curve laterally to conform approximately with and contact the circular wall of the well, and the metal comprising the lower portions of all such blades being bent inward toward the axis of the device to bring such lower portions of all the blades nearer the axis of the device than the said upper mud scraping edges thereof, so that said blades will scrape mud from the wall of the well during the upward movement of the device but will tend to glide over and scrape little or no mud from the wall of the well during the downward movement of the device through the well.

5. In a device for scraping mud from the wall of a well, the combination of outwardly bent springs spaced apart from each other circularly around the axis of the device, and metallic mud scraping blades attached to said springs, each such mud scraping blade presenting an upper mud scraping portion that passes entirely across the outside of its spring and then extends laterally on both sides of its spring in curved direction to conform approximately with and contact the circular wall of the well, and the metal comprising the lower portions of all such blades being bent inward toward the axis of the device to bring such lower portions of the blades nearer the axis of the device than the said upper mud scraping portions thereof, so that said blades will during the upward movement of the device scrape mud from the wall of the well including all the area in front of the springs, but will tend to glide over and scrape little or no mud from the wall of the well during the downward movement of the device through the well.

6. In a device for scraping mud from the wall of a well, the combination of outwardly bowed springs spaced apart from each other circularly around the axis of the device, and mud scraping blades mounted on the springs and presenting upper laterally extending mud scraping edges, the said blades being so located on the springs that said mud scraping edges are approximately at the places where the springs are bowed outward to their maximum amount from the axis of the device, means for securely fastening the said blades to their respective springs at the upper parts of said blades, and the lower parts of said blades being slidably secured to their respective springs at places on the springs substantially below the places where the blades are securely fastened to their respective springs, so that the said lower parts of the blades will slide along the springs when the springs flex.

WILLIAM WALTER HARTMAN.
ROBERT ALEXANDER STEPS.